United States Patent
Yamada

(10) Patent No.: US 7,399,120 B2
(45) Date of Patent: *Jul. 15, 2008

(54) SPINDLE MOTOR

(75) Inventor: Osamu Yamada, Shizuoka (JP)

(73) Assignee: Victor Company of Japan, Limited, Yokohama (JP)

( * ) Notice: Subject to any disclaimer, the term of this patent is extended or adjusted under 35 U.S.C. 154(b) by 292 days.

This patent is subject to a terminal disclaimer.

(21) Appl. No.: 11/271,745

(22) Filed: Nov. 14, 2005

(65) Prior Publication Data

US 2006/0153478 A1 Jul. 13, 2006

(30) Foreign Application Priority Data

Dec. 27, 2004 (JP) ............................. 2004-376018

(51) Int. Cl.
*H02K 7/08* (2006.01)
*F16C 32/06* (2006.01)

(52) U.S. Cl. ........................................ 384/107; 310/90
(58) Field of Classification Search ................ 384/100, 384/107, 112; 310/90; 360/99.08, 98.07
See application file for complete search history.

(56) References Cited

U.S. PATENT DOCUMENTS

| | | | |
|---|---|---|---|
| 7,133,250 B2 * | 11/2006 | Herndon et al. | 360/99.08 |
| 7,134,792 B2 * | 11/2006 | Aiello et al. | 384/107 |
| 7,265,469 B2 * | 9/2007 | Kodama | 310/90 |

FOREIGN PATENT DOCUMENTS

| | | |
|---|---|---|
| JP | 2001-65552 A | 3/2001 |
| JP | 2003-158861 A | 5/2003 |
| JP | 2003-180066 A | 6/2003 |

\* cited by examiner

*Primary Examiner*—Thomas R Hannon
(74) *Attorney, Agent, or Firm*—Connolly Bove Lodge & Hutz LLP

(57) ABSTRACT

A spindle motor (50) is composed of a base (8), a sleeve (4) in cylindrical shape that is fixed on the base (8), a shaft section (1) inserted into a through hole (4b) of the sleeve (4) that is rotatable with respect to the base (8), a hub (7) that rotates together with the shaft section (1), a radial dynamic pressure bearing section (RB) formed between a bushing (13) and the sleeve (4), a flange section (4a) that protrudes in a radial direction on an outer circumferential section of the sleeve (4), a wall section (7a) in annular shape that protrudes with surrounding the sleeve (4), a thrust ring (3) that is fixed on an inner circumferential section of the wall section (7a) being adjacent to the flange section (4a) and the bushing (13) in an axial direction, and a seal plate (17 fixed on an outer circumferential section of the sleeve (4) with sandwiching the thrust ring (3) between the flange section (4a) of the sleeve (4) and the seal plate (17) in an axial direction. The spindle motor (50) is furnished with a first thrust dynamic pressure bearing section (SB1), which is formed between confronting surfaces (3a, 4a1) of the thrust ring (3) and the flange section (4a), and a second thrust dynamic pressure bearing section (SB2), which is formed between confronting surfaces (3b, 17a) of the thrust ring (3) and the seal plate (17).

3 Claims, 3 Drawing Sheets

SPINDLE MOTOR

BACKGROUND OF THE INVENTION

1. Field of the Invention

The present invention relates to a spindle motor that is furnished with a dynamic pressure bearing, particularly, relates to a spindle motor that is suitably installed in a slim disc device or a laser beam printer for driving it.

2. Description of the Related Art

A spindle motor has been demanded for stability at high velocity revolution and excellent durability. In order to cope with these demanded characteristics, a spindle motor, which is furnished with a dynamic pressure bearing device that employs fluidic lubricant, is generalized in the market.

On the other hand, sliming in profile is also demanded for a disc device such as a hard disc drive and a laser beam printer. As a result, a spindle motor, which is furnished with a dynamic pressure bearing device and installed in such a disc device or a laser beam printer, is obliged to be slimed in profile as thin as possible.

In this connection, the Japanese publication of unexamined patent applications No. 2001-65552 disclosed a spindle motor, which was aimed to be slim in profile. According to the spindle motor disclosed in the Japanese publication No. 2001-65552, a thrust bearing section is disposed on an outer circumferential surface of a sleeve, that is, outside a radial bearing section. Traditionally, such a thrust bearing section has been disposed on an end portion of a shaft.

In a conventional spindle motor, a radial bearing section is provided on an inner circumferential surface of a sleeve.

Further, both axial side surfaces of a protrusion section, which protrudes in the radial direction like a flange, are made to be a pair of thrust bearing sections. It shall be understood that these surfaces for the radial and thrust bearing sections are necessary to be formed with an extremely high degree of accuracy.

On the contrary, it is necessary for the conventional spindle motor to be formed with two extra surfaces for thrust bearing sections on the sleeve, which is already provided with a surface for the radial bearing section, in a direction that is perpendicular to the surface for the radial bearing section.

Accordingly, there exists a possible problem of deforming one surface for one thrust bearing section or the surface for the radial bearing section due to overloading while processing to form the one surface for the one thrust bearing section and to form the other surface for the other thrust bearing section thereafter.

In case the deforming occurs, vertical or horizontal degree of accuracy among the surfaces for the thrust and radial bearing sections is deteriorated, and resulting in increasing eccentricity of a shaft while rotating. In some cases, a rotor may contact with a stator, and possibly resulting in disabling a spindle motor to rotate. Consequently, the spindle motor is degraded in reliability.

Further, dynamic pressure is made to be uneven, and resulting in causing a problem of shortening life of the bearing.

Furthermore, in case such a spindle motor is installed in a disc device so as to drive a disc, error possibly occurs when information is recorded on or reproduced from a disc for recording, and possibly resulting in a problem such that recording or reproducing information in high density is difficult.

SUMMARY OF THE INVENTION

Accordingly, in consideration of the above-mentioned problems of the prior arts, an object of the present invention is to provide a spindle motor, which enables to be small in eccentricity of a shaft, long in life, and high in reliability although its thickness is thinned by furnishing a dynamic pressure bearing.

In order to achieve the above object, the present invention provides, according to an aspect thereof, a spindle motor furnished with a dynamic pressure bearing comprising: a base; a sleeve in cylindrical shape being fixed on the base; a shaft section inserted into a through hole of the sleeve, being rotatable with respect to the base; a hub rotating together with the shaft section; a radial dynamic pressure bearing section formed between the shaft section and the sleeve; a flange section protruding in a radial direction on an outer circumferential section of the sleeve; a wall section in annular shape provided on the hub protruding with surrounding the sleeve; a thrust ring fixed on an inner circumferential section of the wall section being adjacent to the flange section and the shaft section in an axial direction; and a seal plate fixed on an outer circumferential section of the sleeve with sandwiching the thrust ring between the flange section of the sleeve and the seal plate in an axial direction, wherein the spindle motor is furnished with a first thrust dynamic pressure bearing section, which is formed between confronting surfaces of the thrust ring and the flange section, and a second thrust dynamic pressure bearing section, which is formed between confronting surfaces of the thrust ring and the seal plate According to another aspect thereof, the present invention provides a spindle motor furnished with a dynamic pressure bearing comprising: a base; a shaft being fixed on the base; a sleeve in cylindrical shape fitted on the shaft being rotatable with respect to the base; a hub rotating together with the sleeve; a radial dynamic pressure bearing section formed between the shaft and the sleeve; a flange section protruding in a radial direction on an outer circumferential section of the sleeve; a wall section in annular shape provided on the base protruding with surrounding the sleeve; a thrust ring fixed on an inner circumferential section of the wall section being adjacent to the flange section and the shaft in an axial direction; and a seal plate fixed on an outer circumferential section of the sleeve with sandwiching the thrust ring between the flange section of the sleeve and the seal plate in an axial direction, wherein the spindle motor is furnished with a first thrust dynamic pressure bearing section, which is formed between confronting surfaces of the thrust ring and the flange section, and a second thrust dynamic pressure bearing section, which is formed between confronting surfaces of the thrust ring and the seal plate.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
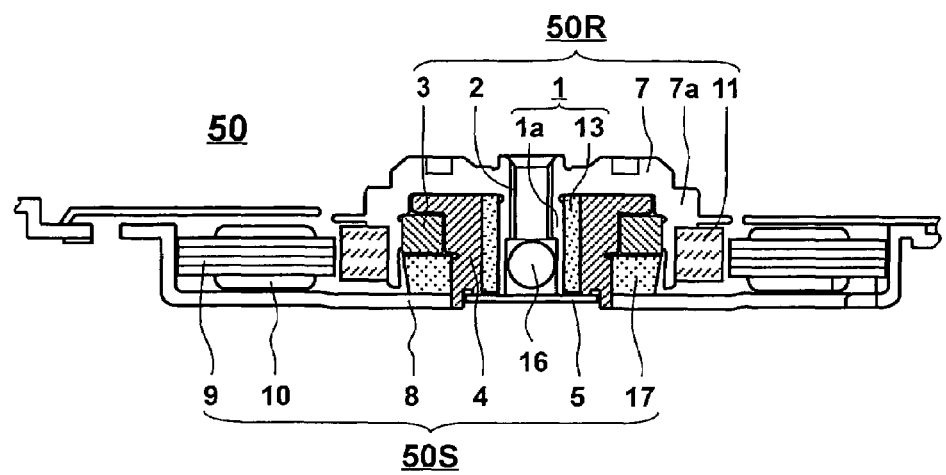
FIG. 1 is a cross sectional view of a spindle motor according to a first embodiment of the present invention.

FIG. 1 is a cross sectional view of a spindle motor according to a first embodiment of the present invention.

Figure 2:
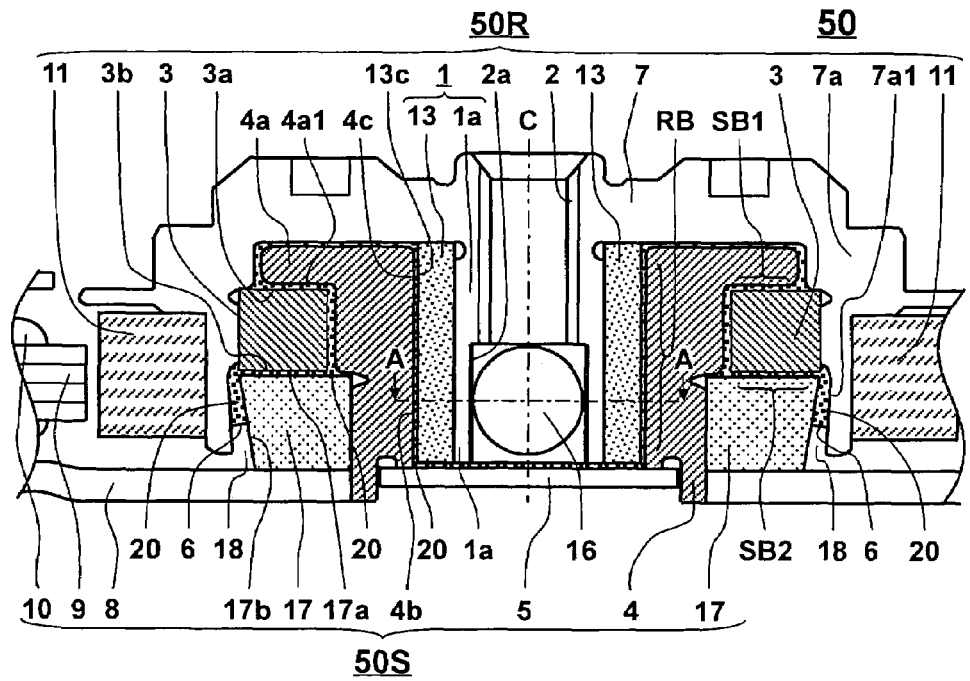
FIG. 2 is a fragmentary cross sectional view, with enlarging a part of the spindle motor shown in FIG. 1.

FIG. 2 is a fragmentary cross sectional view, with enlarging a part of the spindle motor shown in FIG. 1.

Figure 3:
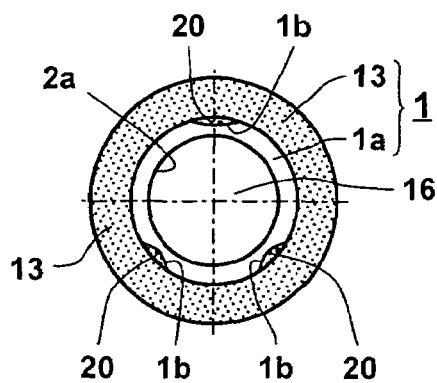
FIG. 3 is a cross sectional view of a shaft section of the spindle motor taken substantially along line A-A of FIG. 2.

FIG. 3 is a cross sectional view of a shaft section of the spindle motor taken substantially along line A-A of FIG. 2.

In FIGS. 1 and 2, a spindle motor 50 according to a first embodiment of the present invention is a so-called inner rotor type motor, which is used in a hard disc device. The spindle motor 50 is composed of a stator 50S and a rotor 50R, which rotates with respect to the stator 50S.

The rotor 50R is further composed of a hub 7 having a core section 1a in cylindrical shape, which is formed together with the hub 7 in one piece so as to function as a center core of the spindle motor 50, and a bushing 13 in cylindrical shape. The bushing 13 is force fitted on an outer circumferential surface of the core section 1a and functions together with the core section 1a as a shaft section 1 of the rotor 50R.

The hub 7 is further formed with a wall section 7a in annular shape, which protrudes from the hub 7 like a flange with surrounding the core section 1a. A ring magnet 11, which is magnetized in the N-pole and the S-pole alternately in multi magnetic poles, is fastened on an outer wall surface of the wall section 7a.

Further, a thrust ring 3 is press fitted into or adhered on an inner wall surface of the wall section 7a.

On the other hand, the stator 50S is further composed of a base 8 and a sleeve 4 that is fixed upright on the base 8. A ring core 9 having a plurality of protrusions (not shown) is fixed on the base 8 and a coil 10 is wound around each of the plurality of protrusions of the ring core 9.

Further, the ring core 9 is disposed so as to confront with the ring magnet 11 while maintaining a prescribed gap between an inner circumferential surface of the ring core 9 and an outer circumferential surface of the ring magnet 11.

The sleeve 4 is in cylindrical shape having a through hole 4b and fitted on the bushing 13 while maintaining a first minute gap between an inner circumferential surface 4c of the through hole 4b and an outer circumferential surface 13c of the bushing 13. In an end portion of the sleeve 4, a flange section 4a, which protrudes from the sleeve 4 in the radial direction, is provided. Besides, an end plate 5 is fixed on another end potion of the sleeve 4 so as to seal the through hole 4b of the sleeve 4.

Further, a seal plate 17 is press fitted on the outer circumferential section of the sleeve 4 so as to sandwich the thrust ring 3 between the wall section 7a of the hub 7 and the seal plate 17 while maintaining a third minute gap between a bottom end surface 3b of the thrust ring 3 and a top end surface 17a the seal plate 17.

In this configuration, a radial dynamic pressure bearing section "RB" is constituted by a radial dynamic pressure groove (not shown), which is at least formed on either the inner circumferential surface 4c of the through hole 4b of the sleeve 4 or the outer circumferential surface 13c of the bushing 13, and lubrication fluid 20 (hereinafter referred to as lubricant) that is filled in the first minute gap between the inner circumferential surface 4c of the through hole 4b of the sleeve 4 and the outer circumferential surface 13c of the bushing 13. The radial dynamic pressure bearing section "RB" is provided at one position or two positions that are apart from each other in the axial direction of the bushing 13.

Further, a thrust dynamic pressure bearing is constituted by a thrust dynamic pressure groove (not shown) that is at least formed on either surface of a bottom end surface 4a1 of the flange section 4a of the sleeve 4 and a top end surface 3a of the thrust ring 3, wherein the bottom end surface 4a1 confronts with the top end surface 3a while maintaining a second minute gap between them, and either surface of the bottom end surface 3b of the thrust ring 3 and the top end surface 17a of the seal plate 17, wherein the top end surface 17a confronts with the bottom end surface 3b while maintaining the third minute gap between them, and the lubricant 20 that is respectively filled in the second minute gap between the top end surface 3a of the thrust ring 3 and the bottom end surface 4a1 of the flange section 4a of the sleeve 4, and in the third minute gap between the bottom end surface 3b of the thrust ring 3 and the top end surface 17a of the seal plate 17.

In other words, the spindle motor 50 is furnished with a first thrust dynamic pressure bearing section SB1, which is formed between the top end surface 3a of the thrust ring 3 and the bottom end surface 4a1 of the flange section 4a of the sleeve 4, and a second thrust dynamic pressure bearing section SB2, which is formed between the bottom end surface 3b of the thrust ring 3 and the top end surface 17a of the seal plate 17.

In this connection, the sleeve 4 is conducted to be in a floating state, that is, a neutral state in the axial direction by dynamic pressure generated by the first and second thrust dynamic pressure bearing sections SB1 and SB2. Consequently, the rotor 50R enables to rotate freely without contacting with any other members constituting the spindle motor 50.

The lubricant 20 is filled in a lubricant filling section that is composed of a first gap between the core section 1a and the end plate 5, a second gap between the bushing 13 and the end plate 5, the first minute gap between the bushing 13 and the sleeve 4, a third gap between the sleeve 4 and the hub 7, the second minute gap between the sleeve 4 and the thrust ring 3, the third minute gap between the thrust ring 3 and the seal plate 17, and a fourth gap between the seal plate 17 and the wall section 7a.

Further, a clearance of the fourth gap between an outer circumferential surface 17b of the seal plate 17 and an inner wall surface 7a1 of the wall section 7a gradually broadens in accordance with a distance from the top end surface 17a toward the base 8, and resulting in forming a taper seal section 6 having a open end 18 of the lubricant filling section. The taper seal section 6 functions as a reservoir for the lubricant 20 filled in the lubricant filling section and prevents the lubricant 20 from leaking out from the lubricant filling section. The lubricant 20 is filled in the lubricant filling section through the open end 18 of the taper seal section 6. An amount of the lubricant 20 is controlled such that a fluidic surface of the lubricant 20 remains in a middle of the taper seal section 6.

As mentioned above, the spindle motor 50 is used for driving a hard disc, particularly, used for installing a hard disc having a smaller inner diameter, so that an internal thread 2 is ground through the center of the hub 7 so as to fix such a hard disc having a small inner diameter in place.

Further, during a manufacturing process of the hub 7, the hub 7 is rinsed after the inner thread 2 is ground. However, in order to sufficiently remove swarf, which is produced during a grinding process of the inner thread 2, and a foreign object contained in cleaning fluid, the inner thread 2 is formed as a part of a through hole 2a.

Furthermore, in order to prevent the lubricant 20 from leaking out from the through hole 2a when the spindle motor 50 is assembled, a sealing member 16 is glued on an inner circumferential surface of the through hole 2a. With respect to a material of the sealing member 16, an elastic body such as a rubber ball having a diameter that is larger than an inner diameter of the through hole 2a enables to be used for the sealing member 16. Such an elastic body is press fitted into or glued on the through hole 2a so as to seal in the lubricant 20.

As mentioned above, the core section 1a is formed together with the hub 7 in one piece. Therefore, vertical degree of accuracy of a thrust bearing section with respect to a radial bearing section enables to be improved more.

As a result, the first to third minute gaps that exist in the thrust bearing sections SB1 and SB2 and the radial bearing section RB are equalized more, and resulting in preventing the spindle motor 50 from overloading while rotating, and preventing rotational members from accidentally contacting with other stationary members. Consequently, reliability of the spindle motor 50 is improved furthermore.

The outer circumferential surface 13c of the bushing 13 is polished. Particularly, a specific area on the outer circumferential surface 13c of the bushing 13 is polished in a higher degree of accuracy so as to minimize surface roughness. The specific area is formed with a radial dynamic pressure groove or confronts with a radial dynamic pressure groove that is formed on the inner circumferential surface 4c of the through hole 4b of the sleeve 4.

As mentioned above, the bushing 13 is press fitted on the core section 1a. In order to reduce press fitting force and to be able to fit the bushing 13 on the core section 1a smoothly without deforming the core section 1a, a plurality of grooves 1b, which extends in the axial direction of the core section 1a, is formed on the outer circumferential surface of the core section 1a. In FIG. 3, three grooves 1b are formed at even intervals in the circumferential direction of the core section 1a.

With respect to number of the grooves 1b, press fitting force is not sufficiently reduced in case the number of the grooves 1b is two or less. Besides, the press fitting force deteriorates cylindrical degree of accuracy of the outer circumferential surface of the core section 1a.

On the contrary, excessive number of the grooves 1b makes processing work unit increased or makes processing devices complicated. Consequently, three grooves are most desirable for the number of grooves 1b.

Further, in order to minimize deformation of the core section 1a or irregularity in perpendicularity of the core section 1a, which may accidentally happen while a plurality of grooves 1a is formed on the outer circumferential surface of the core section 1a, it is desirable for the core section 1a that three grooves 1b are formed simultaneously so as to apply processing stress evenly to the core section 1a.

By providing the grooves 1b, both end portions of the lubricant filling section in the radial bearing section RB are linked. Consequently, the grooves 1b achieve an effect of balancing dynamic pressure, and resulting in preventing problems such as generating negative pressure and floating the rotor 50R excessively, for example.

With referring to FIG. 2, configuration of the taper seal section 6 is detailed next.

In the taper seal section 6, the inner circumferential surface 7a1 of the wall section 7a of the hub 7 is formed as a slanted surface such that an inner diameter of the inner circumferential surface 7a1 decreases in accordance with a direction toward the open end 18 of the taper seal section 6 of the lubricant filling section or a downward direction in FIG. 2.

On the other hand, the outer circumferential surface 17b of the seal plate 17 is formed as a slanted surface such that an outer diameter of the outer circumferential surface 17b decreases in accordance with the direction toward the open end 18 of the taper seal section 6 of the lubricant filling section.

Further, an angle of gradient of the outer circumferential surface 17b with respect to an axis "C" of rotation is designated to be larger than that of the inner circumferential surface 7a1 of the wall section 7a, so that a gap between the outer circumferential surface 17b and the inner circumferential surface 7a1 gradually broadens in accordance with the direction toward the open end 18 of the taper seal section 5 of the lubricant filling section.

In the taper seal section 6 that is constituted as mentioned above, centrifugal force, which is applied to the lubricant 20 when the rotor 50R rotates, acts upon the lubricant 20 so as to be moved into the lubricant filling section. Consequently, the taper seal section 6 enables to prevent the lubricant 20 from leaking out from the lubricant filling section effectively, and results in becoming an extremely reliable sealing section for the lubricant 20.

Further, the taper seal section 6 is disposed in an outermost circumferential area of the lubricant filling section. A cross section area of the taper seal section 6 in annular shape increases in accordance with a distance from the top edge of the outer circumferential surface 17b of the seal plate 17 toward the open end 18. Therefore, capacity inside the taper seal section 6 increases in accordance with a distance from the top edge of the outer circumferential surface 17b of the seal plate 17 toward the open end 18.

Accordingly, fluctuation of a fluidic surface of the lubricant 20 in the taper seal section 6, which is possibly caused by change of temperature, is extremely small. In this connection, the dynamic pressure bearing furnished in the spindle motor 50 according to the first embodiment of the present invention is an extremely reliable bearing.

Second Embodiment

Figure 4:
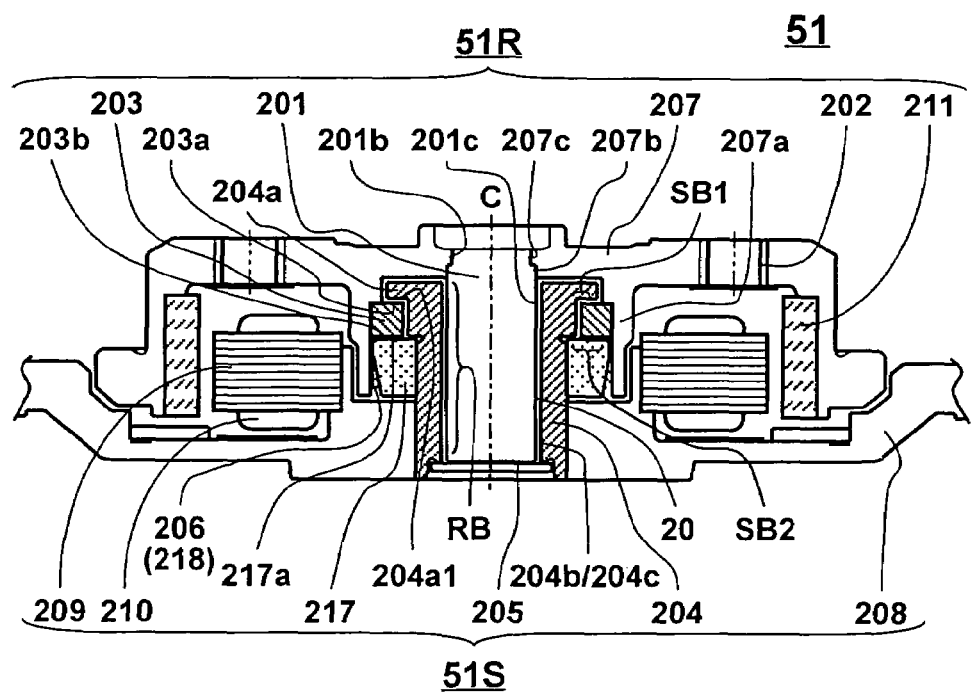
FIG. 4 is a cross sectional view of a spindle motor according to a second embodiment of the present invention.

FIG. 4 is a cross sectional view of a spindle motor according to a second embodiment of the present invention.

A spindle motor 51 according to a second embodiment of the present invention is similar to the spindle motor 50 according to the first embodiment of the present invention. However, the spindle motor 51 is a so-called outer rotor type motor in contrast to the spindle motor 50 that is an inner rotor type motor.

Further, the spindle motor 51 is a so-called shaft rotational type motor in the same manner as the spindle motor 50. However, the spindle motor 51 is applied for driving a hard disc having a larger inner diameter although the spindle motor 50 is applied for driving a hard disc having a smaller inner diameter.

In FIG. 4, the spindle motor 51 is composed of a stator 51S and a rotor 51R, which rotates with respect to the stator 51S. The rotor 51R is further composed of a hub 207 and a shaft 201, which is press fitted into the hub 207.

The hub 207 is further formed with a wall section 207a in annular shape, which protrudes downwards from the hub 207 with surrounding the shaft 201. A ring magnet 211, which is magnetized in the N-pole and the S-pole alternately in multi magnetic poles, is fastened on an inner wall surface of an outer circumferential flanged section of the hub 207.

Further, a thrust ring 203 is press fitted into or adhered on an inner wall surface of the wall section 207a.

On the other hand, the stator 51S is further composed of a base 208 and a sleeve 204 that is fixed upright on the base 208. A ring core 209 having a plurality of protrusions (not shown)

is fixed on the base 208 and a coil 210 is wound around each of the plurality of protrusions of the ring core 209.

Further, the ring core 209 is disposed so as to confront with the ring magnet 211 while maintaining a prescribed gap between an outer circumferential surface of the ring core 209 and an inner circumferential surface of the ring magnet 211.

The sleeve 204 is in cylindrical shape having a through hole 204b and fitted on the shaft 201 while maintaining a first minute gap between an inner circumferential surface 204c of the through hole 204b and an outer circumferential surface 201c of the shaft 201. In an end portion of the sleeve 204, a flange section 204a, which protrudes from the sleeve 204 in the radial direction, is provided. Besides, an end plate 205 is fixed on another end potion of the sleeve 204 so as to seal the through hole 204b of the sleeve 204.

Further, a seal plate 217 is press fitted on the outer circumferential section of the sleeve 204 while maintaining a third minute gap between a bottom end surface 203b of the thrust ring 203 and a top end surface 217a of the seal plate 217.

As mentioned above, the spindle motor 51 is used for driving a hard disc having a larger inner diameter, so that such a hard disc is installed by means of a plurality of internal threads 202 provided on the hub 207. Consequently, no inner thread is ground through the center of the shaft 201 in comparison with the spindle motor 50 according to the first embodiment of the present invention.

Further, the shaft 201 is manufactured independently of the hub 207 in comparison with the core section 1a of the spindle motor 50 according to the first embodiment, so that an outer circumferential surface 201c of the shaft 201 enables to be polished in a higher degree of accuracy. Consequently, it is not necessary for the spindle motor 51 to be provided with a bushing 13 as the spindle motor 50 according to the first embodiment is provided with.

The shaft 201 is press fitted into a through hole 207b of the hub 207. In order to improve press fitting strength and accuracy of radial runout of the shaft 201, a smaller diameter section 201b is provided for a top end portion of the shaft 201 to be press fitted into the through hole 207b, wherein an outer diameter of the smaller diameter section 201b is smaller than an outer diameter of the through hole 207b a little.

Further, a smaller diameter section 207c is provided for the through hole 207b so as to be press fitted on the smaller diameter section 201b of the shaft 201 in place.

Diameters of the smaller diameter sections 201b and 207c are designated such that an overlap width of the smaller diameter sections 201b and 207c is designated to be 5 to 10 µm respectively and overlap widths of other sections are designated to be 5 to 20 µm respectively.

In the above-mentioned configuration of the spindle motor 51, a radial dynamic pressure bearing section "RB" is constituted by a radial dynamic pressure groove (not shown), which is at least formed on either the inner circumferential surface 204c of the through hole 204b of the sleeve 204 or the outer circumferential surface 201c of the shaft 201, and lubricant 20 that is filled in the first minute gap between the inner circumferential surface 204c of the through hole 204b of the sleeve 204 and the outer circumferential surface 201c of the shaft 201.

On the other hand, a thrust dynamic pressure bearing is constituted by a thrust dynamic pressure groove (not shown) that is at least formed on either surface of a bottom end surface 204a1 of the flange section 204a of the sleeve 204 and a top end surface 203a of the thrust ring 203, wherein the bottom end surface 204a1 confronts with the top end surface 203a while maintaining a second minute gap between them, and either surface of the bottom end surface 203b of the thrust ring 203 and the top end surface 217a of the seal plate 217, wherein the top end surface 217a confronts with the bottom end surface 203b while maintaining the third minute gap between them, and the lubricant 20 that is filled in the second minute gap between the top end surface 203a of the thrust ring 203 and the bottom end surface 204a1 of the flange section 204a of the sleeve 204, and in the third minute gap between the bottom end surface 203b of the thrust ring 203 and the top end surface 217a of the seal plate 217.

In other words, the spindle motor 51 according to the second embodiment of the present invention is furnished with a first thrust dynamic pressure bearing section SB1, which is formed between the top end surface 203a of the thrust ring 203 and the bottom end surface 204a1 of the flange section 204a of the sleeve 204, and a second thrust dynamic pressure bearing section SB2, which is formed between the bottom end surface 203b of the thrust ring 203 and the top end surface 217a of the seal plate 217.

In this connection, the sleeve 204 is conducted to be in a floating state, that is, a neutral state in the axial direction by dynamic pressure generated by the first and second thrust dynamic pressure bearing sections SB1 and SB2. Consequently, the rotor 51R enables to rotate freely without contacting with any other members constituting the spindle motor 51.

The lubricant 20 is filled in a lubricant filling section that is composed of a first gap between the shaft 201 and the end plate 205, the first minute gap between the shaft 201 and the sleeve 204, a second gap between the sleeve 204 and the hub 207, the second minute gap between the sleeve 204 and the thrust ring 203; the third minute gap between the thrust ring 203 and the seal plate 217, and a third gap between the seal plate 217 and the wall section 207a.

Further, a clearance of the third gap between the seal plate 217 and the wall section 207a gradually broadens in accordance with a distance from the top end surface 217a of the seal plate 217 toward the base 208, and resulting in forming a taper seal section 206 having an open end 218 of the lubricant filling section. The taper seal section 206 functions as a reservoir for the lubricant 20 filled in the lubricant filling section and prevents the lubricant 20 from leaking out from the lubricant filling section. The lubricant 20 is filled in the lubricant filling section through the open end 218 of the taper seal section 206.

Furthermore, an amount of the lubricant 20 is controlled such that a fluidic surface of the lubricant 20 remains in a middle of the taper seal section 206.

A configuration of the taper seal section 206 is identical to that of the taper seal section 6 of the spindle motor 50 according to the first embodiment, so that further details are omitted.

In the taper seal section 206, centrifugal force, which is applied to the lubricant 20 when the rotor 51R rotates, acts upon the lubricant 20 so as to be moved into the lubricant filling section.

Accordingly, the taper seal section 206 enables to prevent the lubricant 20 from leaking out from the lubricant filling section effectively, and results in becoming an extremely reliable sealing section for the lubricant 20.

Third Embodiment

Figure 5:
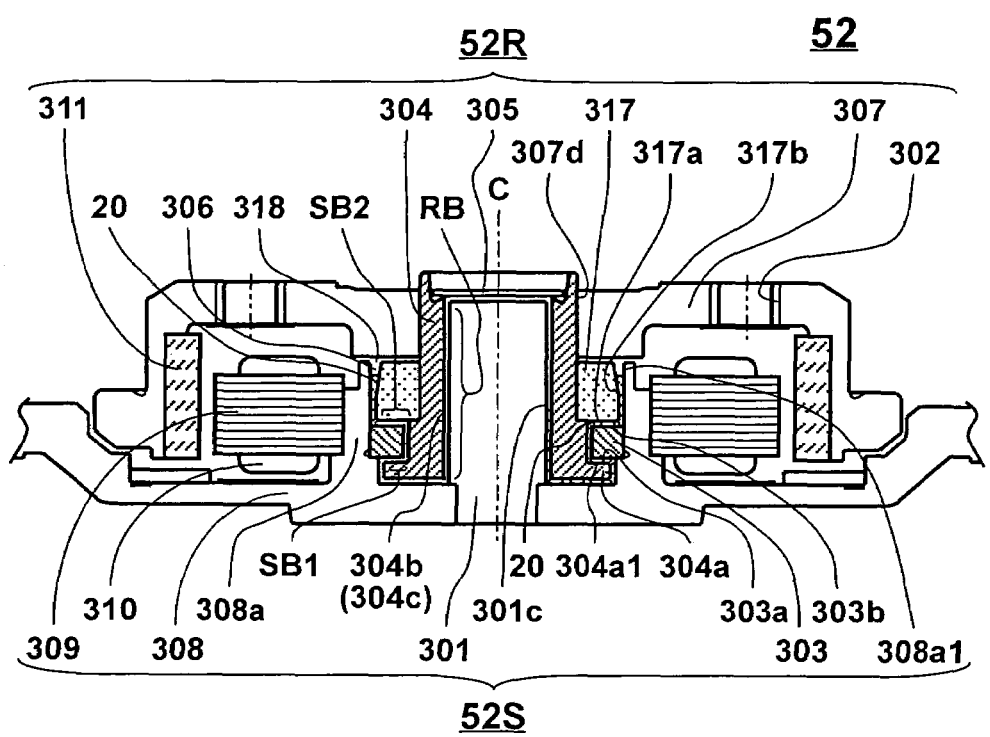
FIG. 5 is a cross sectional view of a spindle motor according to a third embodiment of the present invention.

FIG. 5 is a cross sectional view of a spindle motor according to a third embodiment of the present invention.

A spindle motor 52 according to a third embodiment of the present invention is a so-called outer rotor type spindle motor, which is similar to the spindle motor 51 according to the second embodiment, and applied for driving a hard disc having a larger inner diameter. However, the spindle motor 52 is a so-called shaft fixed type motor in contrast to the spindle motor 51 that is a shaft rotational type motor.

In FIG. 5, the spindle motor 52 is composed of a stator 52S and a rotor 52R. The stator 52S is further composed of a base 308, a shaft 301 that is press fitted and fixed upright on the base 308, a ring core 309 and a coil 310. The base 308 is formed with a protruded section 308a in annular shape that is protruded upwards with surrounding the shaft 301.

Further, a thrust ring 303 is fixed on an inner wall surface of the protruded section 308a of the base 308.

On the other hand, the rotor 52R is further composed of a hub 307 and a sleeve 304 that is press fitted into a through hole 307d of the hub 307. Inside an outer circumferential flanged section of the hub 307, a ring magnet 311 is fastened on an inner wall surface of the outer circumferential flanged section of the hub 307.

Further, the ring magnet 311 is disposed so as to confront with the ring core 309 while maintaining a prescribed gap between an outer circumferential surface of the ring core 309 and an inner circumferential surface of the ring magnet 311.

Furthermore, the sleeve 304 is in cylindrical shape having a through hole 304b and fitted on the shaft 301 while maintaining a first minute gap between an inner circumferential surface 304c of the through hole 304b and an outer circumferential surface 301c of the shaft 301. In a bottom end portion of the sleeve 304, a flange section 304a, which protrudes from the sleeve 304 in the radial direction, is provided. Besides, an end plate 305 is fixed on a top end potion of the sleeve 304 so as to seal the through hole 304b of the sleeve 304.

More, a seal plate 317 is press fitted on the outer circumferential section of the sleeve 304 while maintaining a third minute gap between a top end surface 303b of the thrust ring 303 and a bottom end surface 317a of the seal plate 317.

As mentioned above, the spindle motor 52 is used for driving a hard disc having a larger inner diameter, so that such a hard disc is installed by means of a plurality of internal threads 302 provided on the hub 307.

In the above-mentioned configuration of the spindle motor 52, a radial dynamic pressure bearing section RB is constituted by a radial dynamic pressure groove (not shown), which is at least formed on either the inner circumferential surface 304c of the through hole 304b of the sleeve 304 or the outer circumferential surface 301c of the shaft 301, and lubricant 20 that is filled in the first minute gap between the inner circumferential surface 304c of the through hole 304b of the sleeve 304 and the outer circumferential surface 301c of the shaft 301.

On the other hand, a thrust dynamic pressure bearing is constituted by a thrust dynamic pressure groove (not shown) that is at least formed on either surface of a top end surface 304a1 of the flange section 304a of the sleeve 304 and a bottom end surface 303a of the thrust ring 303, wherein the top end surface 304a1 confronts with the bottom end surface 303a while maintaining a second minute gap between them, and either surface of the top end surface 303b of the thrust ring 303 and the bottom end surface 317a of the seal plate 317, wherein the bottom end surface 317a confronts with the top end surface 303b while maintaining the third minute gap between them, and the lubricant 20 that is respectively filled in the second minute gap between the bottom end surface 303a of the thrust ring 303 and the top end surface 304a1 of the flange section 304a of the sleeve 304, and in the third minute gap between the top end surface 303b of the thrust ring 303 and the bottom end surface 317a of the seal plate 317.

In other words, the spindle motor 52 according to the third embodiment of the present invention is furnished with a first thrust dynamic pressure bearing section SB1, which is formed between the bottom end surface 303a of the thrust ring 303 and the top end surface 304a1 of the flange section 304a of the sleeve 304, and a second thrust dynamic pressure bearing section SB2, which is formed between the top end surface 303b of the thrust ring 303 and the bottom end surface 317a of the seal plate 317.

In this connection, the sleeve 304 is conducted to be in a floating state, that is, a neutral state in the axial direction by dynamic pressure generated by the first and second thrust dynamic pressure bearing sections SB1 and SB2. Consequently, the rotor 52R enables to rotate freely without contacting with any other members constituting the spindle motor 52.

The lubricant 20 is filled in a lubricant filling section that is composed of a first gap between the shaft 301 and the end plate 305, the first minute gap between the shaft 301 and the sleeve 304, a second gap between the sleeve 304 and the base 308, the second minute gap between the sleeve 304 and the thrust ring 303, the third minute gap between the thrust ring 303 and the seal plate 317, and a third gap between the seal plate 317 and the protruded section 308a of the base 308.

Further, a clearance of the third gap between the seal plate 317 and the protruded section 308a gradually broadens in accordance with a distance from the bottom end surface 317a toward the hub 307 upwards, and resulting in forming a taper seal section 306 having an open end 318 of the lubricant filling section. The taper seal section 306 functions as a reservoir for the lubricant 20 filled in the lubricant filling section and prevents the lubricant 20 from leaking out from the lubricant filling section. The lubricant 20 is filled in the lubricant filling section through the open end 318 of the taper seal section 306.

Furthermore, an amount of the lubricant 20 is controlled such that a fluidic surface of the lubricant 20 remains in a middle of the taper seal section 306.

Referring back to FIG. 5, configuration of the taper seal section 306 is detailed next.

In the taper seal section 306, an inner circumferential surface 308a1 of the protruded section 308a of the base 308 is formed as a slanted surface such that an inner diameter of the inner circumferential surface 308a1 decreases in accordance with a direction toward the open end 318 of the taper seal section 306 of the lubricant filling section or an upward direction in FIG. 5.

On the other hand, an outer circumferential surface 317b of the seal plate 317 is formed as a slanted surface such that an outer diameter of the outer circumferential surface 317b decreases in accordance with the direction toward the open end 318 of the taper seal section 306 of the lubricant filling section.

Further, an angle of gradient of the outer circumferential surface 317b with respect to an axis "C" of rotation is designated to be larger than that of the inner circumferential surface 308a1 of the protruded section 308a, so that a gap between the outer circumferential surface 317b and the inner circumferential surface 308a1 gradually broadens in accordance with the direction toward the open end 318 of the taper seal section 306 of the lubricant filling section.

In the taper seal section 306 constituted as mentioned above, centrifugal force, which is applied to the lubricant 20 when the rotor 52R rotates, acts upon the lubricant 20 so as to be moved into the lubricant filling section. Consequently, the taper seal section 306 enables to prevent the lubricant 20 from leaking out from the lubricant filling section effectively, and results in becoming an extremely reliable sealing section for the lubricant 20.

Further, the taper seal section 306 is disposed in an outermost area of the lubricant filling section, and a cross section area of the taper seal section 306 in annular shape increases in accordance with the direction toward the open end 318 of the taper seal section 306. Therefore, capacity inside the taper seal section 306 increases in accordance with the direction toward the open end 18 and the capacity is relatively large.

Accordingly, fluctuation of a fluidic surface of the lubricant 20 in the taper seal section 306, which is possibly caused by change of temperature, is extremely small. In this connection, the dynamic pressure bearing furnished in the spindle motor 52 according to the third embodiment is an extremely reliable bearing.

According to the present invention, there is provided a spindle motor, which exhibits excellent effects such as small in radial runout of a shaft, high in reliability and long in life.

Further, according to each embodiment of the present invention mentioned above, the sleeve 4, 204 or 304 having a radial bearing surface, which constitutes the radial dynamic pressure bearing section RB together with the shaft section 1 or the shaft 201 or 301, is further composed of another bearing surface, which functions as one surface of constituting the thrust dynamic pressure bearing section SB1 together with the thrust ring 3, 203 or 303. However, a plurality of thrust bearing surfaces is not provided on the sleeve 4, 204 or 304. Consequently, perpendicularity between each bearing surface of the sleeve 4, 204 or 304 enables to be maintained in extremely high degree of accuracy, and resulting in minimizing radial runout of the shaft section 1 or the shaft 201 or 301.

Furthermore, gaps disposed in radial and thrust bearing sections are more equalized, and resulting in preventing the spindle motor 50, 51 or 52 from overloading while rotating and preventing rotational members from accidentally contacting with each other.

Accordingly, all of the spindle motors 50, 51 and 52 according to the present invention are improved in reliability and lifetime.

While the invention has been described above with reference to a specific embodiment thereof, it is apparent that many changes, modification and variations in materials and the arrangement of equipment and devices can be made without departing from the invention concept disclosed herein.

Further, it should be understood that many modifications and adaptations of the invention will become apparent to those skilled in the art and it is intended to encompass such obvious modifications and changes in the scope of the claims appended hereto.

What is claimed is:

1. A spindle motor furnished with a dynamic pressure bearing comprising:
   a base;
   a sleeve in cylindrical shape being fixed on the base;
   a shaft section inserted into a through hole of the sleeve, being rotatable with respect to the base;
   a hub rotating together with the shaft section;
   a radial dynamic pressure bearing section formed between the shaft section and the sleeve;
   a flange section protruding in a radial direction on an outer circumferential section of the sleeve;
   a wall section in annular shape provided on the hub protruding with surrounding the sleeve;
   a thrust ring fixed on an inner circumferential section of the wall section being adjacent to the flange section and the shaft section in an axial direction; and
   a seal plate fixed on an outer circumferential section of the sleeve with sandwiching the thrust ring between the flange section of the sleeve and the seal plate in an axial direction,
   wherein the spindle motor is furnished with a first thrust dynamic pressure bearing section, which is formed between confronting surfaces of the thrust ring and the flange section, and a second thrust dynamic pressure bearing section, which is formed between confronting surfaces of the thrust ring and the seal plate.

2. The spindle motor in accordance with claim 1, wherein the shaft section is composed of a core section that is formed together with the hub and a bushing in cylindrical shape that is force fitted on an outer circumferential section of the core section.

3. A spindle motor furnished with a dynamic pressure bearing comprising:
   a base;
   a shaft being fixed on the base;
   a sleeve in cylindrical shape fitted on the shaft being rotatable with respect to the base;
   a hub rotating together with the sleeve;
   a radial dynamic pressure bearing section formed between the shaft and the sleeve;
   a flange section protruding in a radial direction on an outer circumferential section of the sleeve;
   a wall section in annular shape provided on the base protruding with surrounding the sleeve;
   a thrust ring fixed on an inner circumferential section of the wall section being adjacent to the flange section and the shaft in an axial direction; and
   a seal plate fixed on an outer circumferential section of the sleeve with sandwiching the thrust ring between the flange section of the sleeve and the seal plate in an axial direction,
   wherein the spindle motor is furnished with a first thrust dynamic pressure bearing section, which is formed between confronting surfaces of the thrust ring and the flange section, and a second thrust dynamic pressure bearing section, which is formed between confronting surfaces of the thrust ring and the seal plate.

* * * * *